(12) United States Patent
Agrawal et al.

(10) Patent No.: US 10,389,875 B1
(45) Date of Patent: Aug. 20, 2019

(54) NOTIFYING CALLER WHETHER VOICE CALL IS PUBLIC AT THE CALLEE DEVICE

(71) Applicant: Motorola Mobility LLC, Chicago, IL (US)

(72) Inventors: Amit Kumar Agrawal, Bangalore (IN); Rachit Mittal, Bangalore (IN); Wendel Malta De Assis, Campinas (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/218,943

(22) Filed: Dec. 13, 2018

(51) Int. Cl.
*H04M 3/42* (2006.01)
*H04M 1/725* (2006.01)
*H04M 3/487* (2006.01)

(52) U.S. Cl.
CPC ... *H04M 3/42093* (2013.01); *H04M 1/72569* (2013.01); *H04M 3/4872* (2013.01)

(58) Field of Classification Search
CPC ........... H04M 3/42093; H04M 3/4872; H04M 1/72569
USPC ....................................... 455/414.1; 370/338
See application file for complete search history.

(56) References Cited

U.S. PATENT DOCUMENTS 9,225,833 B1 * 12/2015 Koster ................ H04M 3/5175

OTHER PUBLICATIONS

"Accept call then play a pre-recorded voice message to caller", Retrieved at: https://android.stackexchange.com/questions/77846/accept-call-then-play-a-pre-recorded-voice-message-to-caller—on Nov. 21, 2018, 2 pages.
"Button on cell phone to answer and play pre-recorded message", Retrieved at: https://ideas.4brad.com/node/284—on Nov. 21, 2018, Oct. 25, 2005, 4 pages.
"Features | Pre-Answer Recorded Messages", Retrieved at: https://www.fluentstream.com/features/pre-answer-recorded-messages/—on Nov. 21, 2018, 4 pages.
"Motorola Assist Mode", Retrieved at: https://play.google.com/stor/apps/details?id=com.motorola.contextual.smartrules2&hl=en—on Dec. 14, 2018, 3 pages.
"Set up a voicemail greeting", Retrieved at: https://support.google.com/voice/answer/115069?hl=en&co=GENIE.Platform%3DDesktop&oco=1—on Nov. 21, 2018, 2 pages.
Cipriani,"How to decline a phone call with a custom text message on ICS", https://www.cnet.com/how-to/how-to-decline-a-phone-call-with-a-custom-text-message-on-ics/, Jan. 4, 2012, 4 pages.

* cited by examiner

*Primary Examiner* — Marcos Batista
(74) *Attorney, Agent, or Firm* — SBMC

(57) ABSTRACT

A caller initiates, via a caller device, a voice call with a callee, which is received at a callee computing device. The callee computing device audibly announces the voice call, and the callee can respond to the announcement with a voice input that indicates to accept the voice call and that the voice call will be public at the callee computing device. In response, the callee computing device answers the voice call and mutes voice communication from the caller to the callee. A pre-generated message is played back to the caller via the voice call, notifying the caller that the voice call will be public at the callee computing device. After playing back the pre-generated message, the callee computing device un-mutes voice communication from the caller to the callee. The voice call then proceeds with the caller and callee being able to talk to one another.

20 Claims, 6 Drawing Sheets

NOTIFYING CALLER WHETHER VOICE CALL IS PUBLIC AT THE CALLEE DEVICE

BACKGROUND

This application is directed generally to voice calls between devices, and more specifically to notifying a caller whether a voice call is public or private at the callee device.

As technology has advanced, computing devices have become increasingly commonplace in our lives. Many of these computing devices allow user interaction through voice commands to implement a hands-free mode of operation and play back audio via one or more speakers. For example, wireless phones and smart speakers respond to voice commands from a user and play back audio (e.g., music, a caller's voice during a phone call). While these computing devices offer many benefits, they are not without their problems. One such problem is that these devices play back audio for all users in close proximity to the computing device to hear. This can be problematic because during a phone call a caller may assume that he or she can only be heard by the user of the computing device and not others in close proximity to the computing device. This can lead to inappropriate comments and awkward phone conversations, resulting in user dissatisfaction and frustration with their computing devices.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a voice call request incoming to a callee from a caller is detected. The voice call request is announced, and a voice input is received from the callee, the voice input indicating to answer the voice call and whether the voice call will be public at the computing device. In response to the voice input indicating the voice call will be public, the voice call is answered and voice communication from the caller to the callee is muted. Playing of a pre-generated message to the caller as part of the voice call is initiated, the pre-generated message notifying the caller that the voice call will be public at the computing device. The voice communication from the caller to the callee is un-muted upon completion of playing the pre-generated message.

In accordance with one or more aspects, a voice call request incoming to a callee from a caller is received. An indication that the callee has provided a voice input accepting the voice call request and that the voice call will be public at a callee computing device is also received. In response to the indication, the voice call is answered and a voice call connection between a caller device and the callee computing device is established. Voice communication from the caller to the callee is muted, and a pre-generated message is sent to the caller device as part of the voice call, the pre-generated message notifying the caller that the voice call will be public at the callee computing device. The voice communication from the caller to the callee is un-muted upon completion of playing the pre-generated message.

BRIEF DESCRIPTION OF THE DRAWINGS

Embodiments of notifying caller whether voice call is public at the callee device are described with reference to the following drawings. The same numbers are used throughout the drawings to reference like features and components.

DETAILED DESCRIPTION

Figure 1:
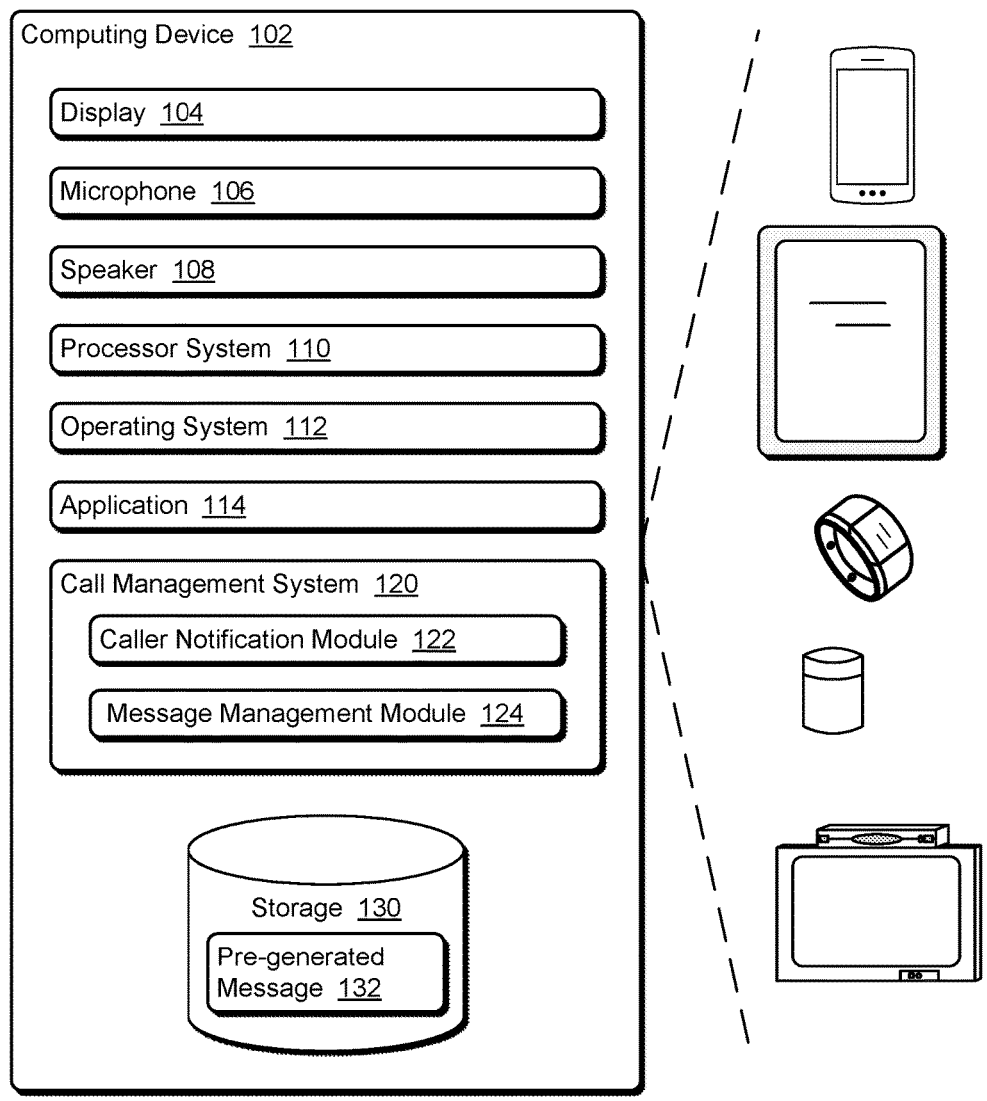
FIG. 1 illustrates an example computing device implementing the techniques discussed herein.

Notifying caller whether voice call is public at the callee device is discussed herein. Voice calls can be made from a caller to a callee. The callee receives the voice call via a callee computing device, which can be any of a variety of different types of computing devices such as a mobile phone, a smart speaker, a television set-top box, and so forth. The caller makes the voice call using a caller device, which can be a computing device such as a mobile phone, a smart speaker, or a television set-top box, or a traditional (e.g., land line) telephone. A voice call established between a caller device and a callee computing device is also referred to as a voice call connection.

The caller initiates the voice call, sending a voice call request from the caller device to the callee computing device. The callee computing device announces the voice call, such as by audibly playing details of the voice call. Various different details can be announced, such as simply the existence of the voice call, the name of the caller, the phone number the call is received from, and so forth. As part of the announcement, a query is optionally played back to the user prompting the user to provide voice input regarding how to handle the voice call. The callee responds to the voice call announcement with a voice input that indicates how to handle the voice call. The voice input can indicate to reject the voice call, in which case the voice call is not answered by the callee computing device.

The voice input can alternatively indicate to accept the voice call, in which case the voice input indicates acceptance of the voice call as well as whether the voice call will be public at the callee computing device. The voice call being public at the callee computing device refers to one or more additional users being in (or anticipated being in) close proximity of the callee computing device, and because the caller's voice will be played back on a speaker of the computing device the voice call will not be private. The voice call being not public (e.g., private) at the callee computing device refers to one or more additional users not being in (or not anticipated as being in) close proximity of the callee computing device, and thus the voice call will be private.

The callee computing device supports a set of commands, one or more of which corresponds to the voice call being public at the callee computing device and one or more of which corresponds to the voice call being private (not public) at the callee computing device. For example, in response to the announcement of the voice call by the callee computing device, the callee can respond with "Answer, Yes" to indicate that the voice call will be not be public, and can respond with "Sure, go ahead" or "Yes, why not" to indicate that the voice call will be public.

In response to a voice input indicating to answer the voice call and that the voice call will not be public, the callee computing device answers the voice call, establishing a voice call connection between the caller device and the callee computing device, and the voice call proceeds. However, in response to a voice input indicating to answer the voice call and that the voice call will be public, the callee computing device answers the voice call, establishing a voice call connection between the caller device and the callee computing device. Voice communication from the caller to the callee is then muted. The voice communication can be muted in different manners, such as muting a speaker of the callee computing device, muting incoming audio from the caller, and so forth. A pre-generated message is then played back to the caller as part of the voice call (over the established voice call connection), notifying the caller that the voice call will be public. For example, a pre-generated message of "Hi, I am with a group of friends and your call will be placed on speakers" can be played back to the caller.

After playing back the pre-generated message, the voice communication from the caller to the callee is un-muted. The voice call then proceeds with the caller and callee being able to talk to one another, although the caller has been notified that other users may be present at the callee computing device.

By notifying the caller that other users may be present at the callee computing device, the caller can avoid making awkward or inappropriate comments that the caller may intend to make privately to the callee. Furthermore, the techniques discussed herein can be implemented on the callee computing device, avoiding the need for any modification of the caller computing device to support the techniques discussed herein. Since the pre-generated message is sent by the callee computing device, the caller need not even be using a computing device (e.g., a traditional landline phone can be used by the caller).

Additionally, the techniques discussed herein do not terminate a voice call. Rather, the voice call is answered by the callee computing device and the pre-generated message is played back to the caller as part of the voice call, then the voice call proceeds as normal allowing the caller and callee to talk to one another.

FIG. 1 illustrates an example computing device 102 implementing the techniques discussed herein. The computing device 102 can be, or include, many different types of computing or electronic devices. For example, the computing device 102 can be a smartphone or other wireless phone, a notebook computer (e.g., netbook or ultrabook), a laptop computer, a wearable device (e.g., a smartwatch, an augmented reality headset or device, a virtual reality headset or device), a tablet or phablet computer, a personal media player, an Internet of Things (IoT) device, a smart speaker, a smart television, a television set-top box, an automotive computer, and so forth.

The computing device 102 optionally includes a display 104. The display 104 can be configured as any suitable type of display, such as an organic light-emitting diode (OLED) display, active matrix OLED display, liquid crystal display (LCD), in-plane shifting LCD, projector, and so forth.

The computing device 102 also includes a microphone 106 and a speaker 108. The microphone 106 can be configured as any suitable type of microphone incorporating a transducer that converts sound into an electrical signal, such as a dynamic microphone, a condenser microphone, a piezo-electric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, and/or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processor system 110 that includes one or more processors, each of which can include one or more cores. The processor system 110 is coupled with, and may implement functionalities of, any other components or modules of the computing device 102 that are described herein. In one or more embodiments, the processor system 110 includes a single processor having a single core. Alternatively, the processor system 110 includes a single processor having multiple cores and/or multiple processors (each having one or more cores).

The computing device 102 also includes an operating system 112. The operating system 112 manages hardware, software, and firmware resources in the computing device 102. The operating system 112 manages one or more applications 114 running on the computing device 102, and operates as an interface between applications 114 and hardware components of the computing device 102.

One or more telephony programs are included in one or both of the operating system 112 and an application 114. A telephony program manages voice calls between the computing device 102 and other devices, including establishing voice call connections, communicating audio over the voice call connection, and so forth.

The computing device 102 also includes a call management system 120 including a caller notification module 122 and a message management module 124. Incoming voice calls are managed by the call management system 120. Generally, the caller notification module 122 manages announcing the voice call to the callee, sending a pre-generated message to the caller, and muting voice communication from the caller to the callee until a pre-generated message is sent to the caller, as discussed in more detail below. The message management module 124 manages generation of the pre-generated message, manages the set of commands used to accept a voice call and indicate whether the call will be public, and so forth.

The call management system 120 can be implemented in a variety of different manners. For example, the call management system 120 can be implemented as multiple instructions stored on computer-readable storage media and that can be executed by the processor system 110. Additionally or alternatively, the call management system 120 can be implemented at least in part in hardware (e.g., as an application-specific integrated circuit (ASIC), a field-programmable gate array (FPGA), and so forth).

The computing device 102 also includes a storage device 130, which can be implemented using any of a variety of storage technologies, such as magnetic disk, optical disc, Flash or other solid state memory, and so forth. The storage device 130 stores various information for the operating system 112, application 114, and call management system 120. For example, the storage device 130 stores a pre-generated message 132 used by the call management system 120. It should also be noted that although the pre-generated message 132 is illustrated as being stored in storage device 130 that is part of the computing device 102, the pre-generated message 132 can additionally or alternatively be stored in other locations. For example, the pre-generated message 132 can be stored in a different device of the user's, can be stored in the cloud or another service, and so forth.

Figure 2:
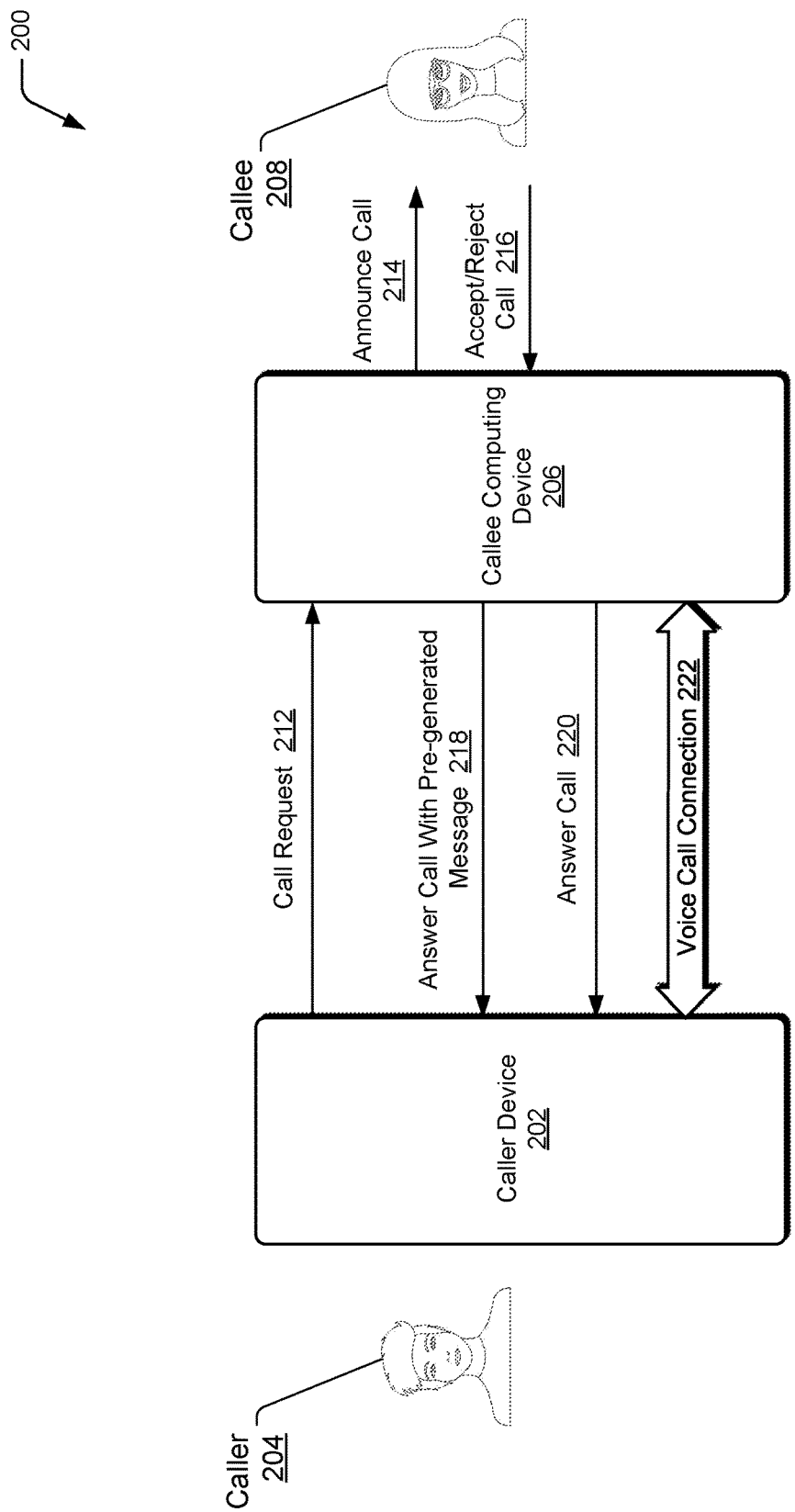
FIG. 2 illustrates an example system implementing the techniques discussed herein.

FIG. 2 illustrates an example system 200 implementing the techniques discussed herein. The system 200 includes a caller device 202 used by a caller 204, and a callee computing device 206 used by a callee 208. The caller device 202 can be implemented in various manners. For example, the caller device 202 can be a computing device (e.g., analogous to the computing device 102 of FIG. 1), a traditional telephone handset (e.g., a landline phone), and so forth. The callee computing device 206 can be any of a variety of types of computing devices, such as a computing device 102 of FIG. 1. A voice call can be established between the caller device 202 and the callee computing device 206 using any one or more of a variety of different voice call technologies and systems, such as Voice over Internet Protocol (VoIP), cellular phone networks, plain old telephone service (POTS), and so forth.

The caller device 202 requests 212 establishment of a voice call, for example in response to a request from the caller 204. The incoming call request is detected by the callee computing device 206, which announces the call request 214 to the callee 208. The callee computing device 206 can announce the call request 214 in various manners, such as audibly announcing details of the voice call, displaying details of the voice call, combinations thereof, and so forth. Various different details can be announced, such as simply the existence of the voice call, the name of the caller, the phone number the call is received from, and so forth.

In response to the call request announcement 214, the callee 208 inputs a voice command 216 that indicates how to handle the call request. In one or more embodiments, the voice input can indicate one of three different user desires: 1) reject the voice call, 2) accept the voice call and indicate to the caller that the voice call will be public at the callee computing device 206, or 3) accept the voice call and indicate to the caller that the voice call will not be public at the callee computing device 206. The voice call being public at the callee computing device 206 refers to one or more additional users being in (or anticipated by the callee 208 as being in) close proximity of the callee computing device 206, and because the caller's voice will be played back on a speaker of the callee computing device 206 the voice call will not be private. The voice call being not public (e.g., private) at the callee computing device 206 refers to one or more additional users not being in (or not anticipated by the callee as being in) close proximity of the callee computing device 206, and thus the voice call will be private.

The callee computing device 206 supports a set of commands, one or more of which corresponds to the voice call being public at the callee computing device 206 and one or more of which corresponds to the voice call being private (not public) at the callee computing device 206. For example, in response to the announcement of the call request 214 by the callee computing device 206, the callee can respond with a voice input of "Answer, Yes" to indicate that the voice call will be not be public, and can respond with a voice input of "Sure, go ahead" or "Yes, why not" to indicate that the voice call will be public.

In response to a voice input to reject the voice call, the voice call is not answered by the callee computing device 206. The voice call may optionally be routed to a voice messaging system, but the requested call between the caller device 202 and the callee computing device 206 to allow the caller 204 and the callee 208 to talk to one another is not established.

In response to a voice input to accept the voice call and indicate to the caller that the voice call will be public at the callee computing device 206, the callee computing device 206 answers the voice call with a pre-generated message 218. More specifically, the callee computing device 206 answers the voice call, establishing a voice call connection 222 between the caller device 202 and the callee computing device 206, and mutes voice communication from the caller 204 to the callee 206. The voice communication can be muted in different manners, such as muting a speaker of the callee computing device 206, muting incoming audio from the caller device 202, and so forth. A pre-generated message is then played over the voice call to the caller device 202, notifying the caller 204 that the voice call will be public. For example, a pre-generated message of "Hi, I am with a group of friends and your call will be placed on speakers" can be played over the voice call to the caller device 202.

After playing back the pre-generated message, the callee computing device 206 un-mutes voice communication from the caller to the callee. The voice call then proceeds with the caller 204 and callee 208 being able to talk to one another, although the caller has been notified that other users may be present at the callee computing device 206. The caller's voice is played back via a speaker of the callee computing device 206, allowing anyone in close proximity of the callee computing device 206 (e.g., within 5-20 feet of the callee computing device 206) to hear the conversation between the caller and the callee.

In response to a voice input to accept the voice call and indicate to the caller that the voice call will not be public at the callee computing device 206, the callee computing device 206 answers the voice call 220, establishing a voice call connection 222 between the caller device 202 and the callee computing device 206. No pre-generated message is sent to the caller device 202 and voice communication from the caller 204 to the callee 206 need not be muted. The voice call then proceeds with the caller 204 and callee 208 being able to talk to one another, and without any notification being provided to the caller that other users may be present at the callee computing device 206. The caller's voice is played back via a speaker of the callee computing device 206, allowing anyone in close proximity of the callee computing device 206 (e.g., within 5-20 feet of the callee computing device 206) to hear the conversation between the caller and the callee.

Returning to FIG. 1, the message management module 124 manages the set of commands used to reject the call as well as accept the call and indicate whether the voice call will be public at the callee computing device 206. The set of commands can be established in one or more of a variety of different manners. In one or more embodiments, the set of commands is pre-configured in the call management system 120 (e.g., by the designer or developer of the call management system 120 or the computing device 102). Additionally or alternatively, the set of commands may be obtained by the call management system 120 from another device or service (e.g., accessed via the Internet).

Additionally or alternatively, the user can provide input to specify particular commands in the set of commands. For example, the user may select from a list of commands which command he or she desires to use to reject a call, which command he or she desires to use to accept a call and indicate that the voice call will be public at the callee computing device 206, which command he or she desires to use to accept a call and indicate the voice call will not be public at the callee computing device 206, or combinations thereof. By way of another example, the user may provide voice inputs of the particular words or phrases he or she desires to use to reject a call, the particular words or phrases he or she desires to use to accept a call and indicate that the voice call will be public at the callee computing device 206, the particular words or phrases he or she desires to use to accept a call and indicate the voice call will not be public at the callee computing device 206, or combinations thereof. These user selections can be made at various times, such as during a start-up or initialization feature of the call management system 120, after user selection of a customization or settings option for the call management system 120, and so forth.

Furthermore, in one or more embodiments the user is notified of the ability of the call management system 120 to accept the call and indicate whether the voice call will be public at the callee computing device 206, essentially letting the user know that this functionality is available to him or her. This notification can be performed at various times, such as during initialization or first start-up of the computing device 102 or the call management system 120, after the user has answered one or more voice calls on the computing device 102, and so forth.

The message management module 124 also manages generation and storage of the pre-generated message 132. The pre-generated message 132 can be generated in one or more of a variety of different manners. In one or more embodiments, the pre-generated message 132 is pre-configured in the call management system 120 or the storage device 130 (e.g., by the designer or developer of the call management system 120 or the computing device 102). Additionally or alternatively, the pre-generated message 132 may be obtained by the message management module 124 from another device or service (e.g., accessed via the Internet).

Additionally or alternatively, the user can provide input to specify the pre-generated message 132. For example, the user may provide a voice input of the particular words or phrases he or she desires to use as the pre-generated message, and the message management module 124 records and stores this voice input as the pre-generated message 132. By way of another example, the user may select from a list of pre-generated messages. This user input can be made at various times, such as during a start-up or initialization feature of the call management system 120, after user selection of a customization or settings option for the call management system 120, and so forth.

Although a single pre-generated message 132 is illustrated in FIG. 1, it should be noted that multiple pre-generated messages can alternatively be used. Different commands can correspond to different pre-generated messages, and in response to a particular voice input to accept the call and indicate that the voice call will be public at the callee computing device 206, the pre-generated message corresponding to that particular voice input is played back to the caller. Which pre-generated message corresponds to which voice input can be specified in various manners, such as by user selection of commands and corresponding pre-generated messages.

By way of example, one pre-generated message may be "Hi, I am with a group of friends and your call will be placed on speakers", and is played back in response to a voice input of "Yes, why not". Another pre-generated message may be "Hi, I am with coworkers and your call will be placed on speakers", and is played back in response to a voice input of "Sure, go ahead".

The techniques discussed herein thus allow the callee to provide a voice input to accept the voice call and indicate that the voice call will be public at the callee computing device 206. This provides information describing the callee's context to the caller, allowing the caller to be careful regarding what he or she says to the callee. Furthermore, the pre-generated message is not played back at the callee computing device, so other users in proximity of the callee computing device do not hear the pre-generated message that is played for the caller. The voice input provided by the callee indicating that the voice call will be public at the callee computing device 206 need not mention that there are other people in close proximity to the callee (e.g., the voice input can simply be "Sure, go ahead"). Thus, other users in close proximity of the callee computing device need not, and typically are not, aware that the pre-generated message has been played back to the caller (and thus are not aware that the caller has been notified that other users may be present at the callee computing device).

Figure 3:
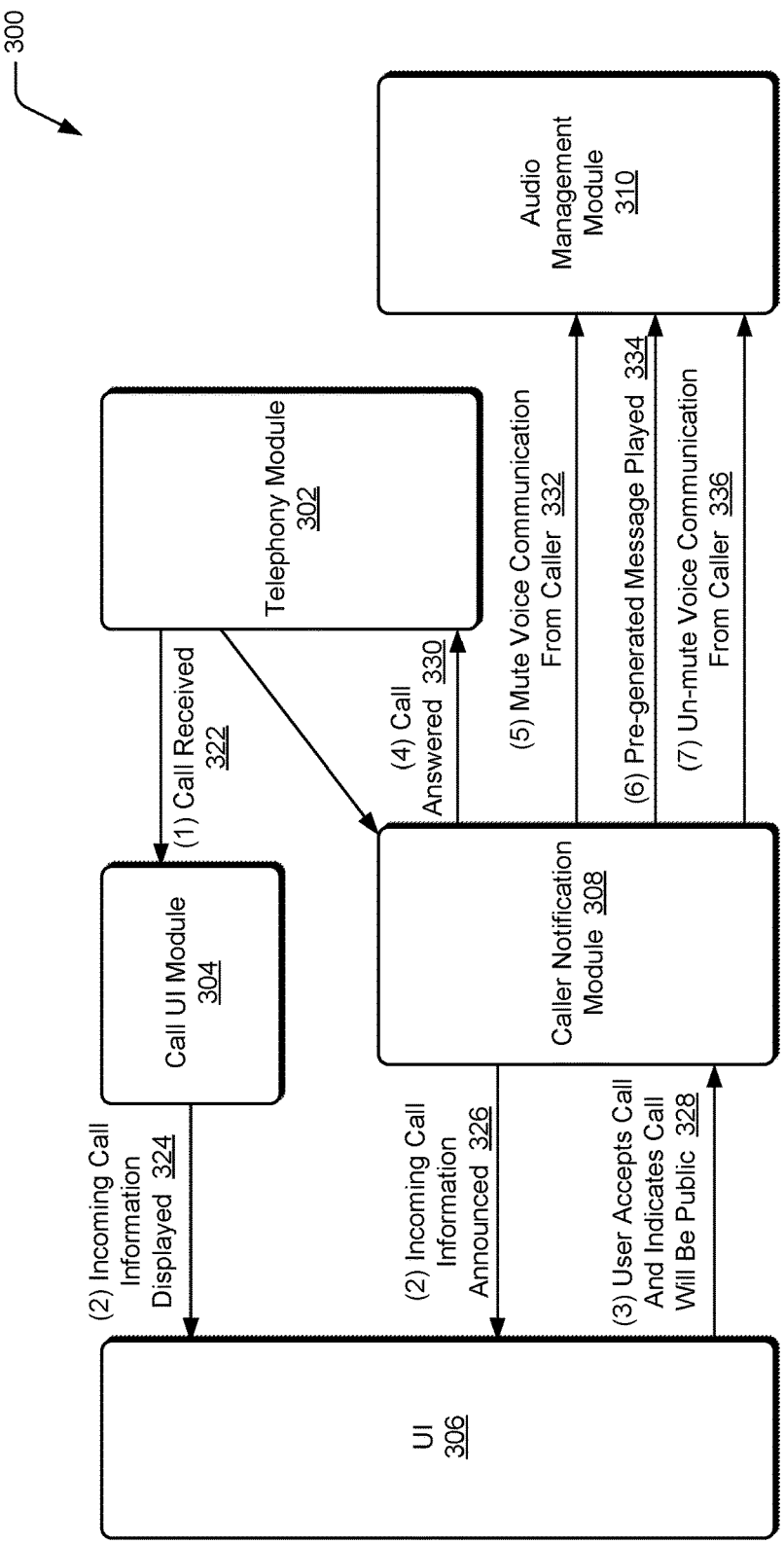
FIG. 3 illustrates another example system implementing the techniques discussed herein.

FIG. 3 illustrates an example system 300 implementing the techniques discussed herein. The system 300 illustrates an example where the callee provides a voice input to accept the voice call and indicate to the caller that the voice call will be public at the callee computing device. The system 300 can be implemented by a computing device of the callee (e.g., the computing device 102 of FIG. 1 or the callee computing device 206 of FIG. 2). For example, the system 300 can be implemented by the call management system 120 and the operating system 112 of the computing device 102.

The system 300 includes a telephony module 302, a call user interface (UI) module 304, a UI 306, a caller notification module 308 (e.g., which can be a caller notification module 122 of FIG. 1), and an audio management module 310. Various operations are performed by the system 300 in sending a pre-generated message to the caller. An example order of the performance of these operations is illustrated in FIG. 3.

The telephony module 302 receives a voice call request and sends a call received notification 322 to the call UI module 304 and the caller notification module 308. The call received notification indicates to both the call UI module 304 and the caller notification module 308 that the voice call request has been received.

The call UI module 304 displays information regarding the incoming call 324 via the UI 306. This displayed information can take various forms, such as displaying the name or picture of the caller, displaying the phone number of the caller, and so forth. Approximately concurrently with displaying information regarding the incoming call 324, the caller notification module 308 announces information regarding the incoming call 326 via the UI 306. This announcement is an audible announcement, and can include any of a variety of different details regarding the caller or the voice call as discussed above.

In response to the announcement of information regarding the incoming call 326, the user accepts the voice call and indicates the voice call will be public 328. The user indicates this acceptance by voice input as discussed above.

The caller notification module 308 sends a call answered notification 330 to the telephony module 302, indicating to the telephony module 302 that the user has accepted the voice call. The telephony module 302 proceeds to answer the voice call, communicating with the phone or computing device of the caller to establish the voice call connection.

The caller notification module 308 also sends a mute voice communication from caller notification 332 to the audio management module 310. In response to the mute voice communication from caller notification 332, the audio management module 310 mutes the voice communication from the caller. This muting can be performed in various manners as discussed above, such as muting (e.g., turning off) the speakers at the callee computing device, muting (e.g., deleting) the incoming voice call data stream from the caller computing device, and so forth.

The caller notification module 308 also plays the pre-generated message 334 to the audio management module 310. The audio management module 310 routes the pre-generated message 334 to the telephony module 302 (rather than playing it back locally at the callee computing device). The telephony module 302 then plays back the pre-generated message over the established voice call so that the pre-generated message can be heard by the caller.

Upon completion of playing back the pre-generated message, the caller notification module 308 sends an un-mute voice communication from caller notification 336 to the audio management module 310. In response to the un-mute voice communication from caller notification 336, the audio management module 310 un-mutes the voice communication from the caller. This un-muting can be performed in various manners depending on the manner in which the voice communication from the caller was previously muted. For example, the un-muting can be performed by un-muting (e.g., turning on) the speakers at the callee computing device, un-muting (e.g., ceasing deleting) the incoming voice call data stream from the caller computing device, and so forth.

The specific manner in which the system 300 is implemented can vary based on the particular architecture of the computing device and the particular operating system of the computing device implementing the system 300. For example, the call management system 120 (or message management module 124) can be granted permission to record raw voice call audio using an Audio Record API (application programming interface). In order to route audio playback to the outgoing audio stream of the voice call, an instance of an audio player (e.g., AudioTrack or MediaPlayer) is created and playback from the audio player is routed to the telephony module 302 by setting a Preferred Device method of the instance of the audio player with a value indicating a type of telephony. In order to mute the voice communication from the caller, the caller notification module 308 calls a Stream Volume method of the audio management module 310 with parameters indicating that the voice call stream is to be set to mute. Similarly, in order to un-mute the voice communication from the caller, the caller notification module 308 calls the Stream Volume method of the audio management module 310 with parameters indicating that the voice call stream is to be set to un-mute.

The techniques discussed herein can be implemented on a single computing device, such as the callee computing device as discussed above. Additionally or alternatively, at least some of the operations can be performed by another device or service, such as a cloud service.

Figure 4:
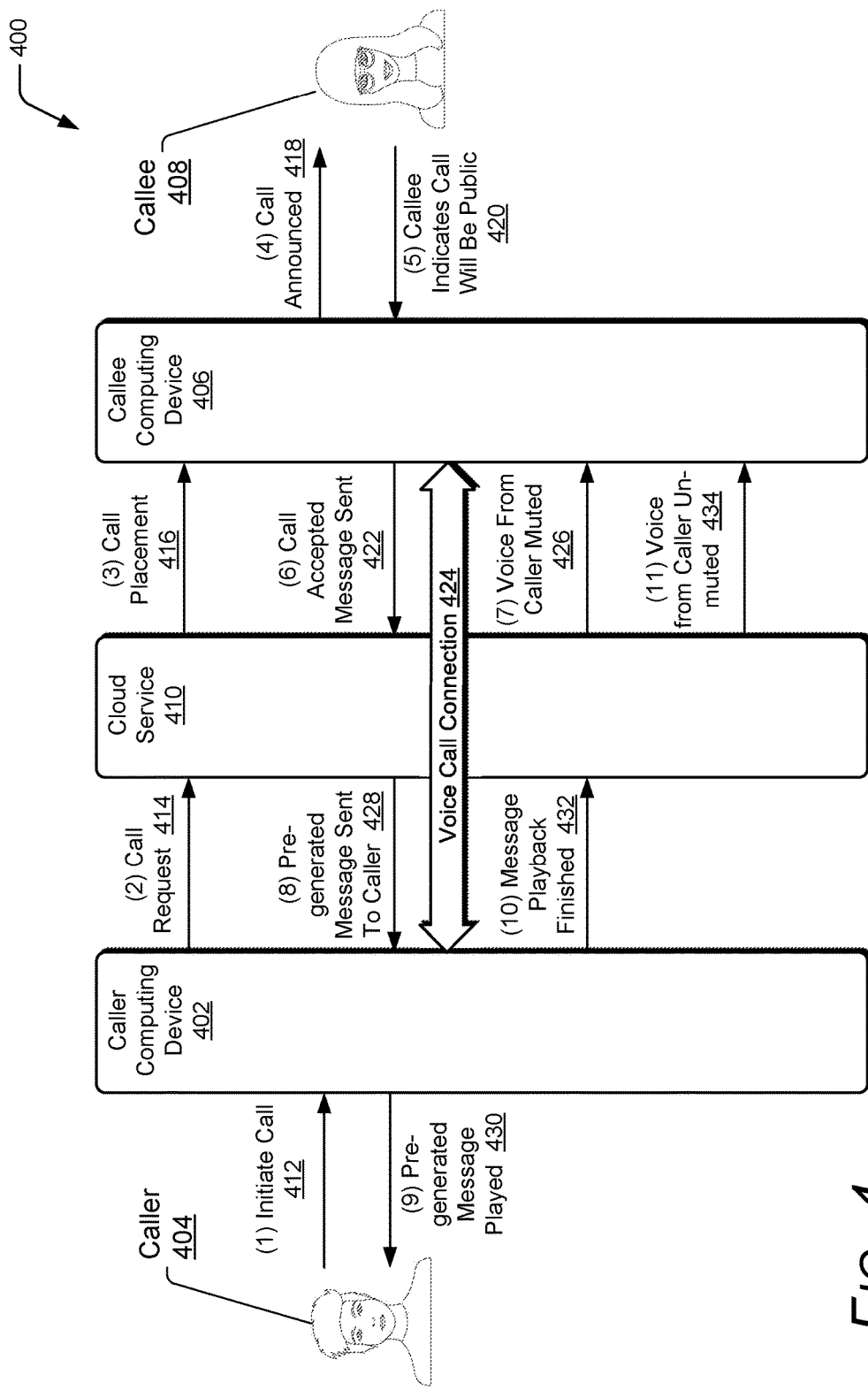
FIG. 4 illustrates an example system implementing the techniques discussed herein at least in part in a cloud service.

FIG. 4 illustrates an example system 400 implementing the techniques discussed herein at least in part in a cloud service. The system 400 includes a caller computing device 402 used by a caller 404, a callee computing device 406 used by a callee 408, and a cloud service 410. The cloud service 410 can be implemented by one or more of a variety of different computing devices, such as one or more server computers. Although illustrated as a computing device, the caller computing device 402 can be implemented as a traditional telephone handset (e.g., a landline phone). A voice call can be established between the caller computing device 402 and the callee computing device 406 using one or a variety of different voice call technologies and systems, such as VoIP, cellular phone networks, POTS, and so forth. Various operations are performed by the system 400 in sending a pre-generated message to the caller 404. An example order of the performance of these operations is illustrated in FIG. 4.

The caller 404 initiates the voice call 412, such as by inputting a request to the caller computing device 402 to place a voice call to the callee 408. The caller computing device 402 sends a call request 414 to the cloud service 410 in response to the caller 404 initiating the voice call. The cloud service 410 places a voice call 416 to the callee computing device 406, which announces the incoming voice call 418 to the callee 408. The callee computing device 406 can announce the voice call 418 in various manners, such as audibly announcing details of the voice call, displaying details of the voice call, combinations thereof, and so forth. Various different details can be announced, such as simply the existence of the voice call, the name of the caller, the phone number the call is received from, and so forth.

In response to the call request announcement 418, the callee 408 inputs a voice command 420 that indicates to accept the voice call and to indicate to the caller 404 that the voice call will be public at the callee computing device 406. In response to the voice command 420, the callee computing device 406 sends a call accepted message 422 to the cloud service 410. In response to the call accepted message 422, the cloud service 410 answers the voice call on behalf of the callee computing device 406 and establishes a voice call connection 424 between the caller computing device 402 and the callee computing device 406.

Also in response to the call accepted message 422, the cloud service 410 mutes voice communication from the caller 426. The cloud service 410 can mute voice communication from the caller 426 in various different manners, such as by deleting or ignoring incoming voice data from the caller computing device 402 over the voice call connection. Additionally or alternatively, the cloud service 410 can mute voice communication from the caller 426 in other manners, such as by sending a notification to the callee computing device 406 to mute the speaker of the callee computing device 406, or by sending a notification to the caller computing device 402 to mute the microphone of the caller computing device 402.

The cloud service 410 also sends a pre-generated message 428 to the caller computing device 402 via the voice call connection 424. The pre-generated message is maintained by the cloud service 410 as associated with one or both of the callee 408 and the callee computing device 406. Thus, different callees and/or different callee computing devices can have different associated pre-generated messages. The pre-generated message can be associated with the callee 408 or the callee computing device 406 in various manners, such as using a login id for the callee 408 or the callee computing device 406, using a phone number of the callee 408 or the callee computing device 406, and so forth.

The caller computing device 402 plays back the pre-generated message 430 to the caller 404. In one or more embodiments, the pre-generated message is sent to the caller computing device 402 by being played back from the cloud service 410 over the voice call connection 424 established between the caller computing device 402 and the callee computing device 406. In response to playback of the pre-generated message being completed by the caller computing device 402, the caller computing device 402 sends a message playback finished notification 432 to the cloud service 410.

In response to the message playback finished notification 432, the cloud service 410 un-mutes voice communication from the caller 434. The cloud service 410 can un-mute voice communication from the caller 434 in various different manners depending on how the voice communication from the caller was previously muted. For example, the cloud service 410 can cease deleting or ignoring incoming voice data from the caller computing device 402 over the voice call connection. By way of another example, the cloud service 410 can send a notification to the callee computing device 406 to un-mute the speaker of the callee computing device 406, or send a notification to the caller computing device 402 to un-mute the microphone of the caller computing device 402.

After voice communication from the caller 404 is un-muted, the voice call proceeds with the caller 404 and callee 408 being able to talk to one another via the established voice call connection 424.

In one or more embodiments, additional functionality is also provided by the cloud service 410. For example, various functionality of the call management system 120 of FIG. 1 can be implemented in the cloud service 410. This functionality can include management of the pre-generated message (including storing and input/selection of the pre-generated message by the callee 408), management of the set of commands to accept a voice call and indicate whether the call will be public, and so forth.

Figure 5:
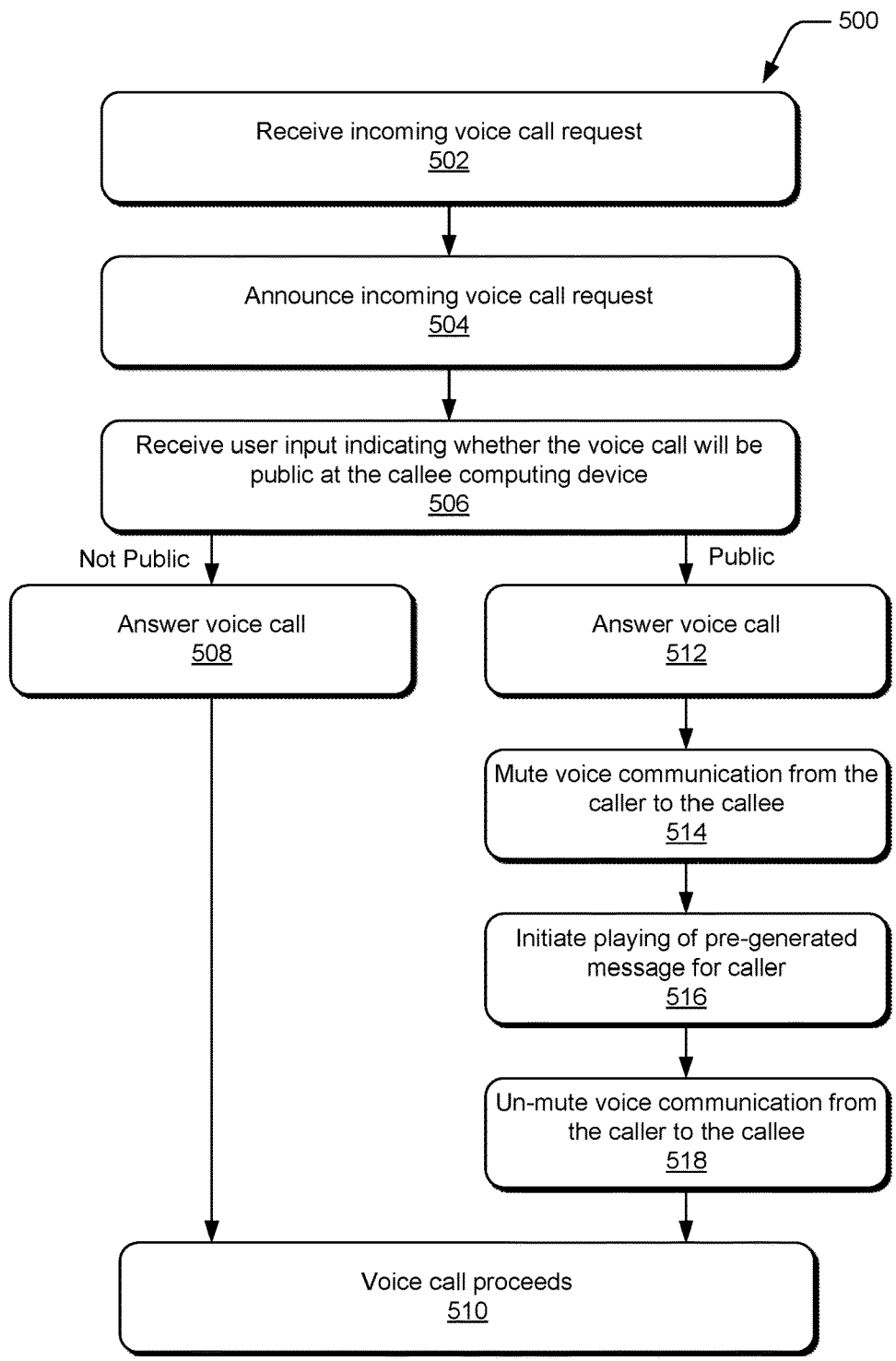
FIG. 5 illustrates an example process for implementing the techniques discussed herein in accordance with one or more embodiments.

FIG. 5 illustrates an example process 500 for implementing the techniques discussed herein in accordance with one or more embodiments. Process 500 is carried out by a callee computing device such as the computing device 102 of FIG. 1 or the callee computing device 206 of FIG. 2, or alternatively can be implemented in part by a cloud service such as the cloud service 410 of FIG. 4, and can be implemented in software, firmware, hardware, or combinations thereof. Process 500 is shown as a set of acts and is not limited to the order shown for performing the operations of the various acts.

In process 500, an incoming voice call request is received (act 502). The incoming voice call request is a request for a voice call to be established between the caller and the callee.

The incoming voice call request is announced (act 504). The announcement is made audibly, and can include various details regarding the voice call, the caller computing device, and/or the caller as discussed above.

User input indicating whether the voice call will be public at the callee computing device is received (act 506). The user input is a voice input provided by the user, and is a command indicating to the callee computing device to answer the voice call and that the voice call will be public at the callee computing device, or a command indicating to the callee computing device to answer the voice call and that the voice call will not be public at the callee computing device.

In response to receiving a user input indicating that the voice call will not be public at the callee computing device, the voice call is answered (act 508). Answering the voice call establishes a voice call connection between the caller device and the callee computing device, allowing the caller and the callee to talk to one another. The voice call then proceeds (act 510), allowing the caller and callee to talk to one another. The caller's voice is played back via a speaker of the callee computing device, allowing anyone in close proximity of the callee computing device (e.g., within 5-20 feet of the callee computing device) to hear the conversation between the caller and the callee.

In response to receiving a user input indicating that the voice call will be public at the callee computing device, the voice call is answered (act 512). Answering the voice call establishes a voice call connection between the caller device and the callee computing device, allowing the caller and the callee to talk to one another.

Voice communication from the caller to the callee over the voice call is muted (act 514). The voice communication between from the caller to the callee can be muted in various manners, such as by muting a microphone, dropping or ignoring received audio data, muting a speaker, and so forth. In one or more embodiments the voice communication is muted in act 514 immediately after answering the voice call in act 512. Thus, the voice communication is muted prior to allowing the caller and the callee to talk to one another over the established voice call connection.

Playing of the pre-generated message for the caller is initiated (act 516). This initiating of playing the pre-generated message can be playing of the pre-generated message by the callee computing device. Additionally or alternatively, this initiating of playing the pre-generated message can be sending of a request by the callee computing device to another device or service (e.g., a cloud service) to play the pre-generated message.

The voice communication from the caller to the callee over the voice call is then un-muted (act 518). The voice communication can be un-muted in various manners depending on how the voice communication was muted in act 514 as discussed above. The voice communication can be un-muted in response to various different events occurring or conditions being satisfied. For example, the voice communication can be un-muted in response to playing of the pre-generated message having been completed, in response to a threshold amount of time (e.g., 5 seconds) elapsing since the voice communication was muted, and so forth.

The voice call then proceeds (act 510), allowing the caller and callee to talk to one another. The caller's voice is played back via a speaker of the callee computing device, allowing anyone in close proximity of the callee computing device (e.g., within 5-20 feet of the callee computing device) to hear the conversation between the caller and the callee. It should be noted that the voice call is not terminated or disconnected after playing the pre-generated message in act 516. Rather, the pre-generated message is played back to the caller over the established voice call connection between the caller device and the callee computing device, and then the voice call proceeds allowing the caller and called to talk to one another.

It should be noted that the techniques discussed herein are optionally employed only in certain situations. For example, the callee can set or configure the callee computing device to implement the technique discussed herein by enabling a hands-free mode, by enabling a mode supporting both audio announcement of voice calls and voice inputs, and so forth.

It should further be noted that although discussion is included herein of the voice call being public at the callee computing device referring to one or more additional users being in (or anticipated by the callee as being in) close proximity of the callee computing device, the callee can additionally or alternatively indicate the voice call will be public in response to other conditions or situations. For example, if the callee is comfortable placing the voice call on speakerphone for anyone in close proximity to the callee computing device to hear regardless of what the caller says, then the callee can provide the voice input to indicate to the caller that the voice call will not be public at the callee computing device (and thus avoid playback of the pre-generated message to the caller).

It should also be noted that some functionality discussed herein as being performed by the callee computing device or a cloud service can additionally or alternatively be implemented by other devices, such as the caller computing device. For example, rather than muting (and subsequently un-muting) voice communication from the caller at the callee computing device or at the cloud service, a notification can be sent to the caller computing device to mute (and subsequently un-mute) voice communication from the caller. The caller computing device can mute and un-mute voice communication from the caller in various manners, such as by muting and un-muting a microphone of the caller computing device, by dropping or ignoring (and subsequently ceasing dropping or ignoring) voice data received from the caller.

It should further be noted that although voice calls are discussed herein, additional types of content can also be communicated analogously to audio data discussed herein. For example, a voice call may include video data (e.g., as part of a video conference). Video data can be muted (e.g., by dropping or ignoring the video data received from the caller device) analogously to the audio data while the pre-generated message is played at the caller device, then the video data can be un-muted (e.g., by ceasing dropping or ignoring the video data received from the caller device).

It should also be noted that although muting and un-muting voice communication from the caller is discussed herein, additionally or alternatively voice communication from the callee can be muted and subsequently un-muted. The voice communication from the callee is muted, for example at approximately the same time as the voice communication from the caller is muted. Voice communication from the callee can be muted in various manners analogous to the muting of voice communication from the caller, such as by muting a microphone at the callee device, dropping or ignoring received audio data (e.g., at a cloud service or the caller device), and so forth. The voice communication from the callee is subsequently un-muted, for example at approximately the same time as the voice communication from the callee is un-muted. Muting the voice communication from the callee prevents any noise (e.g., anyone speaking in close proximity to the callee computing device) from being mixed with the pre-generated message being played back for the caller.

Figure 6:
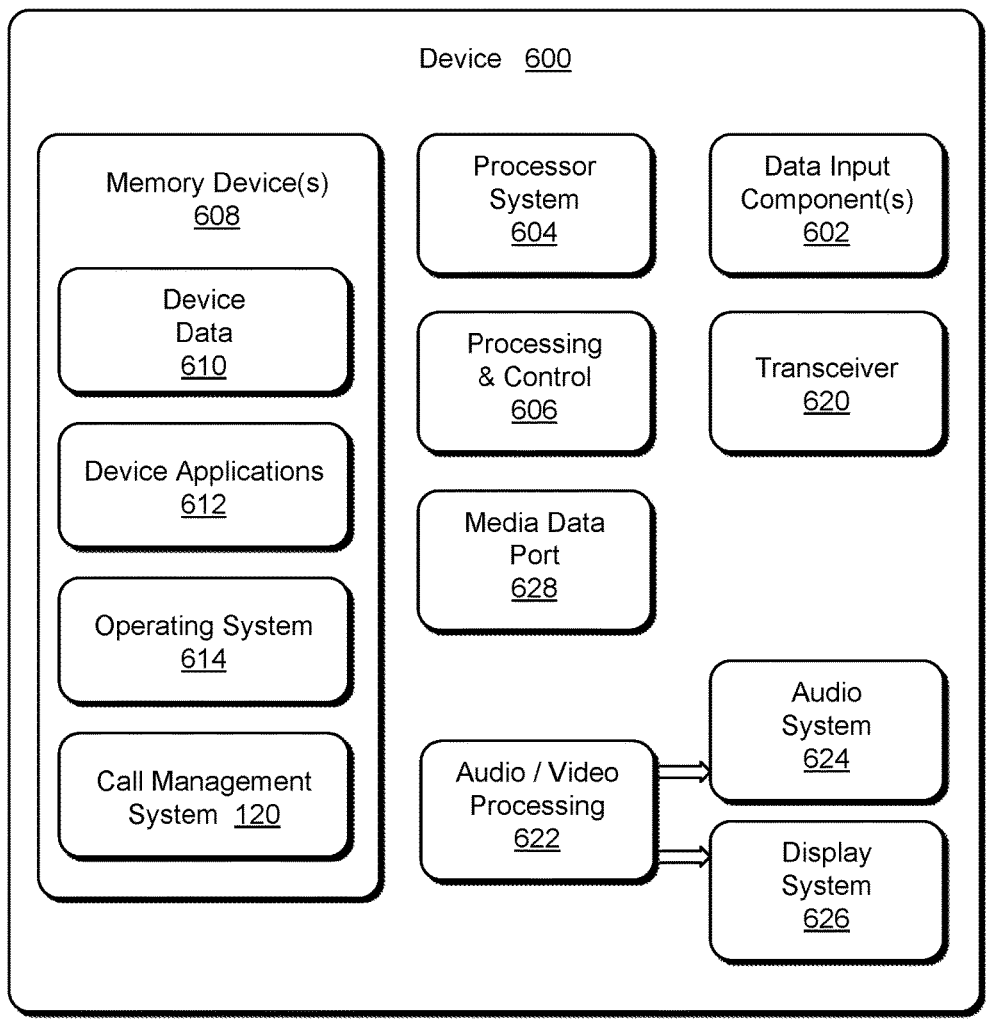
FIG. 6 illustrates various components of an example electronic device that can implement embodiments of the techniques discussed herein.

FIG. 6 illustrates various components of an example electronic device 600 that can be implemented as a computing device as described with reference to any of the previous FIGS. 1, 2, 3, 4, and 5. The device 600 may be implemented as any one or combination of a fixed or mobile device in any form of a consumer, computer, portable, user, communication, phone, navigation, gaming, messaging, Web browsing, paging, media playback, or other type of electronic device.

The electronic device 600 can include one or more data input components 602 via which any type of data, media content, or inputs can be received such as user-selectable inputs, messages, music, television content, recorded video content, and any other type of audio, video, or image data received from any content or data source. The data input components 602 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 602 may also include various other input components such as microphones, touch sensors, keyboards, and so forth.

The electronic device 600 of this example includes a processor system 604 (e.g., any of microprocessors, controllers, and the like) or a processor and memory system (e.g., implemented in a system on a chip), which processes computer executable instructions to control operation of the device 600. A processor system 604 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 600 can be implemented with any one or combination of software, hardware, firmware, or fixed logic circuitry implemented in connection with processing and control circuits that are generally identified at 606. Although not shown, the electronic device 600 can include a system bus or data transfer system that couples the various components within the device 600. A system bus can include any one or combination of different bus structures such as a memory bus or memory controller, a peripheral bus, a universal serial bus, or a processor or local bus that utilizes any of a variety of bus architectures.

The electronic device 600 also includes one or more memory devices 608 that enable data storage such as random access memory, nonvolatile memory (e.g., read only memory, flash memory, erasable programmable read only memory, electrically erasable programmable read only memory, etc.), and a disk storage device. A memory device 608 provides data storage mechanisms to store the device data 610, other types of information or data (e.g., data backed up from other devices), and various device applications 612 (e.g., software applications). For example, an operating system 614 can be maintained as software instructions with a memory device and executed by the processor system 604.

In one or more embodiments the electronic device 600 includes a call management system 120, described above. Although represented as a software implementation, the call management system 120 may be implemented as any form of a control application, software application, signal processing and control module, firmware that is installed on the device 600, a hardware implementation of the modules, and so on.

Moreover, in one or more embodiments the techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 608.

The electronic device 600 also includes a transceiver 620 that supports wireless and/or wired communication with other devices or services allowing data and control information to be sent as well as received by the device 600. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, and so forth.

The electronic device 600 can also include an audio or video processing system 622 that processes audio data or passes through the audio and video data to an audio system 624 or to a display system 626. The audio system or the display system may include any devices that process, display, play, or otherwise render audio, video, display, or image data. Display data and audio signals can be communicated to an audio component (e.g., a speaker) or to a display component via a radio frequency link, S-video link, high definition multimedia interface (HDMI), composite video link, component video link, digital video interface, analog audio connection, or other similar communication link, such as media data port 628. In implementations the audio system or the display system are external components to the electronic device. Alternatively or in addition, the display system can be an integrated component of the example electronic device, such as part of an integrated touch interface.

Although embodiments of techniques for implementing notifying caller whether voice call is public at the callee device have been described in language specific to features or methods, the subject of the appended claims is not necessarily limited to the specific features or methods described. Rather, the specific features and methods are disclosed as example implementations of techniques for implementing notifying caller whether voice call is public at the callee device.

What is claimed is:

1. A method implemented in a computing device, the method comprising:
   detecting a voice call request incoming to a callee from a caller;
   announcing the voice call request;
   receiving a voice input from the callee, the voice input indicating to answer the voice call and whether the voice call will be public at the computing device; and
   in response to the voice input indicating the voice call will be public,
      answering the voice call,
      muting voice communication from the caller to the callee,
      initiating playing of a pre-generated message to the caller as part of the voice call, the pre-generated message notifying the caller that the voice call will be public at the computing device, and
      un-muting voice communication from the caller to the callee upon completion of playing the pre-generated message.

2. The method as recited in claim 1, the muting voice communication including muting audio received from the caller.

3. The method as recited in claim 1, the muting voice communication including muting a speaker of the computing device.

4. The method as recited in claim 1, the method further comprising:
   in response to the voice input indicating the voice call will not be public, continuing with the voice call without playing the pre-generated message to the caller.

5. The method as recited in claim 1, the pre-generated message comprising a message previously recorded by the callee and stored at the computing device.

6. The method as recited in claim 1, the initiating playing of the pre-generated message comprising playing the pre-generated message from the computing device.

7. The method as recited in claim 1, the announcing the voice call comprising playing an audible notification of the voice call on a speaker of the computing device.

8. The method as recited in claim 1, the voice input comprising a command from a set of one or more commands, the command indicating to answer the voice call and that one or more additional users are in close proximity of the callee.

9. A computing device comprising:
   a processor; and
   a computer-readable storage medium having stored thereon multiple instructions that, responsive to execution by the processor, cause the processor to perform acts comprising:
      detecting a voice call request incoming to a callee from a caller;
      announcing the voice call request;
      receiving a voice input from the callee, the voice input indicating to answer the voice call and whether the voice call will be public at the computing device; and
      in response to the voice input indicating the voice call will be public,
         answering the voice call,
         muting voice communication from the caller to the callee,
         initiating playing of a pre-generated message to the caller as part of the voice call, the pre-generated message notifying the caller that the voice call will be public at the computing device, and
         un-muting voice communication from the caller to the callee upon completion of playing the pre-generated message.

10. The computing device as recited in claim 9, the muting voice communication including muting audio received from the caller.

11. The computing device as recited in claim 9, the muting voice communication including muting a speaker of the computing device.

12. The computing device as recited in claim 9, the acts further comprising:
    in response to the voice input indicating the voice call will not be public, continuing with the voice call without playing the pre-generated message to the caller.

13. The computing device as recited in claim 9, the pre-generated message comprising a message previously recorded by the callee and stored at the computing device.

14. The computing device as recited in claim 9, the initiating playing of the pre-generated message comprising playing the pre-generated message from the computing device.

15. The computing device as recited in claim 9, the announcing the voice call comprising playing an audible notification of the voice call on a speaker of the computing device.

16. The computing device as recited in claim 9, the voice input comprising a command from a set of one or more commands, the command indicating to answer the voice call and that one or more additional users are in close proximity of the callee.

17. A method implemented in one or more computing devices, the method comprising:
   receiving a voice call request incoming to a callee from a caller;
   receiving an indication that the callee has provided a voice input accepting the voice call request and that the voice call will be public at a callee computing device; and
   in response to the indication,
      answering the voice call and establishing a voice call connection between a caller device and the callee computing device,
      muting voice communication from the caller to the callee,
      sending a pre-generated message to the caller device as part of the voice call, the pre-generated message notifying the caller that the voice call will be public at the callee computing device, and
      un-muting voice communication from the caller to the callee upon completion of playing the pre-generated message.

18. The method as recited in claim 17, the muting voice communication including deleting voice data received from the caller computing device.

19. The method as recited in claim 17, the pre-generated message comprising a message previously recorded by the callee and stored at at least one of the one or more computing devices.

20. The method as recited in claim 17, the sending the pre-generated message to the caller device comprising playing the pre-generated message at least one of the one or more computing devices.

* * * * *